June 21, 1966     R. C. WICKER     3,256,770
LITHOGRAPHIC COLOR ANALYZER
Filed April 10, 1962     3 Sheets-Sheet 1

INVENTOR.
RALPH C. WICKER
BY
ATTORNEY

June 21, 1966     R. C. WICKER     3,256,770

LITHOGRAPHIC COLOR ANALYZER

Filed April 10, 1962     3 Sheets-Sheet 2

INVENTOR.
RALPH C. WICKER

BY

ATTORNEY

June 21, 1966   R. C. WICKER   3,256,770
LITHOGRAPHIC COLOR ANALYZER
Filed April 10, 1962   3 Sheets-Sheet 3
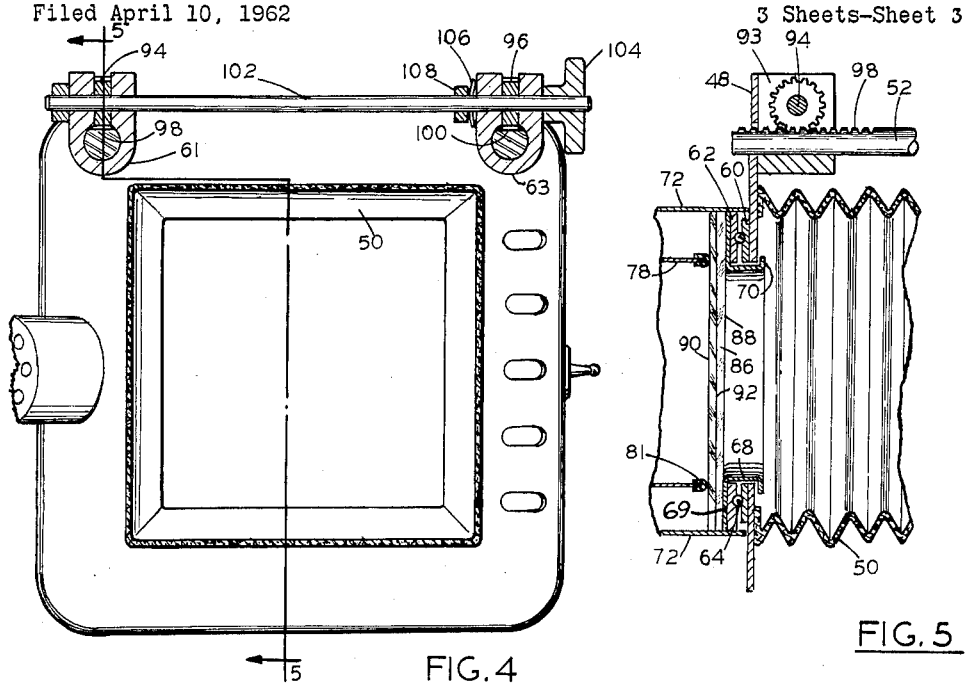
FIG. 4
FIG. 5
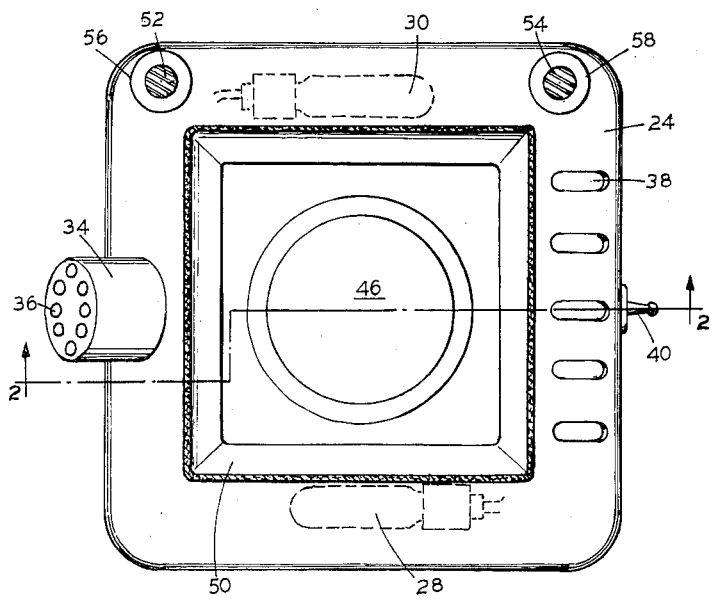
FIG. 3
INVENTOR.
RALPH C. WICKER
BY
ATTORNEY

United States Patent Office 3,256,770
Patented June 21, 1966

3,256,770
LITHOGRAPHIC COLOR ANALYZER
Ralph C. Wicker, Guilford, Conn., assignor, by mesne assignments, to Chesley F. Carlson Company, Minneapolis, Minn., a corporation of Minnesota
Filed Apr. 10, 1962, Ser. No. 186,555
8 Claims. (Cl. 88—14)

This invention relates to color lithographic work, and more particularly to a device for determining the relative weight, or dot size of any particular color employed in color lithographic print transparencies, reproductions and the like.

In multi-color photo-lithographic work it is the practice to employ a series of half tone dots uniformly spaced on lines disposed at 90° to each other. The lines along which the dots are disposed for any one color are disposed at angles to the lines along which the dots of another color are disposed. For example where the colors red, yellow, blue and black are employed, the red dots may be disposed along lines at an angle of 45° from the lines along which the yellow dots are disposed, 60° from the lines along which the blue dots are disposed and 30° from the lines along which the black dots are disposed. Such disposition of the colors at the angles referred to results in a minimum of interference effect between the various colors. In any multi-color lithographic work the frequency of the dots for all the colors, black being referred to as a color, have a common frequency, such as 150 to the inch in fine work, and 133, or 120, or 60 to the inch in less refined work. Dot frequence of 300 to the inch are also employed in highly refined work. The weight of any color in any particular area depends upon the size of the dots employed in printing that color and the size of the dots may be referred to as a percent of the total area, that is the area of each dot in relation to the area represented by the square of the spacing between dot centers is expressed as a precent.

The color effects which are produced by the multiplicity of fine dots superimposed over one another, from the basic colors such as red, yellow, blue and black, the dots of which are disposed on lines corresponding to the color angles referred to, depends upon the percent or dot size of each color including black in a given area. In reproducing color lithographs it is often desirable to know the dot size or percent in any given area of any one or all of the basic colors including black employed in such area. The minute size of the dot, together with the fine spacing, and the presence of dots of the other colors including black all superimposed on one another, when added to the fact that the percent of a particular color under observation may be in the order of 5%, whereas the densities of the other colors in the area may be much greater, all tend to hide or overshadow such color, and present a serious problem of analysis.

The present invention is directed to an analyzing device which renders it possible to at once observe the dots of any selected color, without resort to high power lenses and the like, whereby one may ascertain quickly the percent size of any color, the analysis of which is desired.

In patent No. 3,109,239, there is disclosed a device for quickly ascertaining the angles at which the dots of the basic colors are disposed, which consists of a screen having dots of about 40 percent size, with dot spacing corresponding to the spacing employed in the color lithographic work. By placing such a screen over a particular color lithograph, and rotating the same, it can be quickly ascertained, by unaided visual observation of the varying interference pattern between the dots of the screen and the dots of the color whose angle is sought, the angles at which the different color dot lines lie. The interference patterns, resulting from the screen dots superimposed over the lithograph dots of a color, when the screen and the lithographic reproduction dot lines are in alignment, disappear, since each dot of the screen corresponds with a dot of the lithograph. As the screen is rotated relative to the lithograph, however, an interference pattern is developed resulting in a checkerboard effect, the light and dark areas of which are so many times larger than the dot spacing of the screen as to be visible without aid of magnification. The size of the individual light and dark areas of the checkerboard effect produced by the interference appear to decrease from an infinite size or disappearance at alignment to a rapidly decreasing lesser size as the screen is rotated from alignment through a slight angle. It has been discovered that upon rotation of the screen about three degrees out of alignment, from any one color, the interference effect produces a checkerboard effect, in which the space between the dark squares is about an eighth to a quarter of an inch, where the screen and lithographic reproduction have a dot spacing of 150 to the inch, as for example. By selecting a standard angle of misalignment, such as three degrees, the apparent dot size produced by the interference pattern may be visually observed, and if the screen used for generating the interference is a 5% screen, that is dots of small size, the apparent size, as compared to the dot spacing may be readily observed unaided by magnification, and the percent readily judged directly, or compared to standards produced by a screen of like dot percentage size employed over screens of known dot size, and employing the same interference angle.

The above and other discoveries render it possible to produce a magnification effect by interference, resulting in ready observation without powerful magnification of the dot size of any color, and facilitates the separation of any one color for observation from the remaining colors. In addition to the foregoing the present invention is also directed to an apparatus capable of combining on a ground glass screen, the interference pattern produced by a color of a reproduction and a screen having dots of the same periodicity, whereby without great magnification as by powerful lenses and the like, and by the naked eye if desired, the dot percent size of any color may be observed and quickly judged without eye strain.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, where like reference characters indicate like parts:

FIGURE 3 is a transverse section taken on the line 3—3 of FIGURE 1;

FIGURE 4 is a transverse section taken on the line 4—4 of FIGURE 1; and

FIGURE 5 is a fragmentary sectional detail taken on the broken line 5—5 of FIGURE 4.

Figure 1:
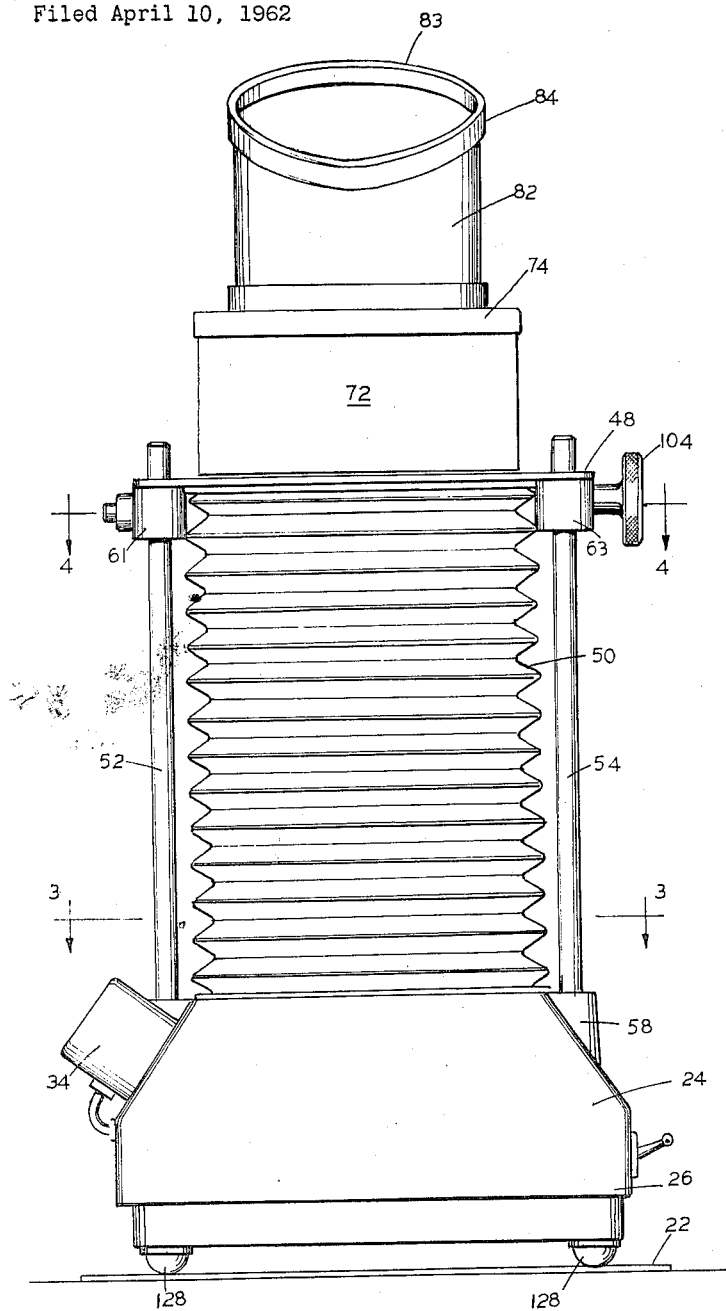
FIGURE 1 is a front elevational view of a preferred form of the color analyzer utilizing the invention.
Figure 2:
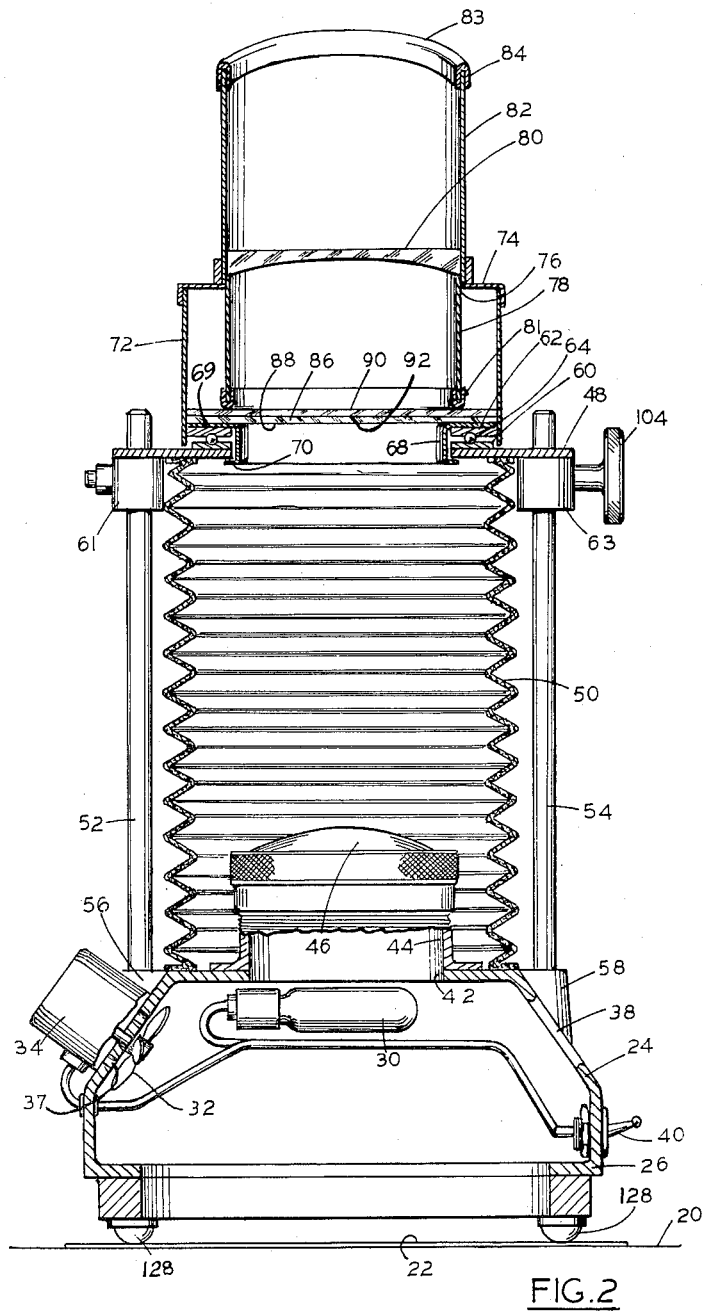
FIGURE 2 is a vertical sectional view of the analyzer, with parts in elevation, taken substantially on the line 2—2 of FIGURE 3.

Referring to FIGURES 1 and 2, there is shown a table 20 on which is placed a multicolor lithographic reproduction 22. The reproduction may be a picture having colors such as blue, red, yellow, and black applied thereto, or a color screen, the various colors, of which are half tones employing a dot periodicity for example of a standard spacing such as 150 to the inch. The analyzer comprises a base 24 having a flared rectangular bottom as at 26 fitted with antifriction roller balls 128 in the four corners so that the apparatus may be freely rolled over the reproduction without damaging the same to selected areas thereof for observation. Within the base are a pair of high intensity light sources 28 and 30, which may preferably have a yellowish tinge and be provided with reflectors for flooding the reproduction with high intensity illumination. In order to prevent over heating, a fan 32 driven by a motor 34 may be provided, the motor having vents 36, for bringing air in, and the base having openings 37 and louvers 38 through which the air may pass. A switch 40, conveniently located as shown, is adapted to simultaneously energize the lamps and blower.

The base has in its upper side, a circular opening 42, and an upstanding sleeve 44 having a projection lens 46 mounted on the upper end. Surrounding the sleeve 44, and extending from the base 24 to the upper deck 48 is a light impervious flexible bellows 50. A pair of upstanding guide rods 52 and 54, rigidly mounted in bosses 56 and 58 formed in the base extend upwardly to support the deck, the deck being provided with collar sleeves 61 and 63 slidable on the rods 52 and 54. The deck has mounted thereon an anular anti-friction bearing comprising spaced raceways 60 and 62, and intervening anti-friction-balls 64. Overlying the upper raceway is an annular plate 69 having a square perimeter an internal depending cylindrical collar 68, extending through a circular deck aperture. The collar is outwardly flanged as at 70 beneath the deck to secure the raceways to the deck, the flange being spaced slightly from the underside of the deck to permit free rotation of the upper raceway.

Mounted on the plate 69, is a square upstanding housing 72, having a cover 74 that has a friction fit thereover, so as to be removable. The cover is provided with a circular opening 76 in which is inserted a cylindrical sleeve 78, the upper end of which has a viewing lens 80, and the lower end of which has an annular "U" sectioned bead of rubber or other soft resilient material 81. The cover is provided with an upstanding shroud 82, disposed about the lens 80, the upper end of which is contoured as at 83 and provided with a soft rubber cushion 84, so that an operator may rest his forehead upon the cushioned end for viewing purposes as will hereinafter be referred to. Seated on the plate 69 is a half tone screen, 86 which may be a square thin glass plate, the emulsion 88 of which is on the underside, and thereabove is a ground glass screen 90, the ground surface 92 of which is on the underside.

Means for raising or lowering the deck slidably upon the rods 52 and 54 are shown in FIGURES 4 and 5, the guide sleeves 61 and 63 being recessed at the rear as at 93 to receive pinions 94 and 96 meshing with rack teeth 98 and 100 in the backside of the rods 52 and 54. The pinions are fixed upon a transverse shaft 102, having a knurled hand wheel 104 at one end, and suitable friction means 106 in the form of a dished spring washer compressed by a collar 108 is provided to hold the shaft against undesired rotation in any set position.

In operation, if the reproduction subject to analysis is a four color lithographic reproduction having red, yellow, blue and black, each color employing dots spaced 150 to the inch, the angular relation between the rows of dots forming the various colors may be disposed in accordance with standard practice such as red at 45°, black at 75°, yellow at 90°, and blue at 105°. In practice in single pass color printing, the colors may be applied to the reproduction in the following order, yellow, blue and red followed by black. The projection lens may have a focal length of about 4", and be disposed midway between the reproduction 22 and the emulsion surface 88 of the half tone screen. The periodicity of the dots upon the screen will be 150 to the inch to correspond to the periodicity of the reproduction, and the dots will be uniform in size and cover 90 to 95% of the screen area, and will preferably extend in rows at right angles, parallel with the edges of the plate 86. The location of the racks will be such that the deck may be suitably adjusted so that the distance between the emulsion surface and the lens will be the same as the distance from the lens to the reproduction or about eight inches, and the spacing between the reproduction 22 and emulsion surfaces 88 will be 16 inches. The range of vertical adjustment of the deck, will be such that an image of the reproduction will be projected in the plane of the emulsion, of the exact same size as the reproduction. The viewing lens provides a convenient low power magnification of what appears on the ground glass screen immediately adjacent the screen 88. By orienting the lines of dots of the screen 88 so as to be parallel with the dots of a selected color of the reproduction 22, and by deviating therefrom by about two or three degrees, an interference pattern, checkerboard like, will appear on the ground glass screen. The alternate squares of the apparent pattern will be solely of the color chosen for observation and the intermediate "squares" will have the appearance resulting from the net effect of the remaining colors not under observation and analysis, and be subdued by the relatively dark screen so as to be relatively unnoticeable, in comparison to the manner in which the selected color squares will stand out. The color under observation will neither appear as strong or weak, but will appear as areas, the size of which relative to the center to center spacing therebetween will serve to show the observer the actual percent size of dot of that color used at that area, since the interference which renders the color so clearly distinguishable from the remaining colors produces a magnified effect that is substantially directly proportional to the actual dot size of the color, but whose size is so small as to preclude observation without high power magnification. Since the angle of the screen 88 is but about three degrees out of orientation with the color being analyzed, it is at least 12 degrees off from any other color not being analyzed and thus any interference pattern as might be present between the screen and the color not being analyzed, will be so microscopic as to be invisible to the observer, with the low power of the viewing lens 80. In practice the magnification power of the lens 80 may be about 6 times or less. While checkerboard effect has been referred to, in describing the interference pattern when deorientation of about three degrees is established, the reference thereto is not intended to mean that the "squares" of the color being analyzed are the same size as the alternate intervening squares, since it is the relative size of the squares of the color being analyzed, relative to the spacing between centers of adjacent squares which provides the observer with the information as to the percent dot size of the color in the actual reproduction at the area under observation.

In practice, the apparatus will be placed over a color reproduction such as 22, with the side edges of the base parallel with the side edges of the frame of the picture. The illumination is then turned on, and the viewing lens assembly is then rotated until it is oriented with the color to be analyzed, it being seen that the screen 88 is thus rotated. As the dot lines in the screen 88 approach within a few degrees of orientation with a color the so called checkerboard formation will at once appear, the alternate "squares" of which will show the color, and the size of such squares can be adjusted by increasing or decreasing the angle of disorientation, increasing the angle decreasing the spacing between square centers without affecting the proportion between the effective color dot size seen, and the spacing therebetween as seen. About three degrees provides a suitable spacing for easy observation, at which the actual relative size of the effective color squares seen can be judged sufficiently closely in comparison to the spacing between adjacent color squares so that the operator will at once be able to tell the percent size of the color dots in the reproduction 22 causing the greatly enlarged interference.

In viewing the dot size, the viewing assembly comprising the ground glass screen and the 95% screen are adjusted so that the 95% screen is in focus; that is the dots projected from the reproduction upon the 95% screen are of the exact same periodicity or spacing as those on the 95% screen. When so positioned the actual features of the picture, that is the group effect of all of the colors, is not observable. By lowering the assembly by rotation of the hand wheels 104, slightly so as to bring the ground glass surface into focus, or even slightly below focus, the actual features of the picture area are at once seen, and the interference disappears because the dot pitch projected on the screen has had its pitch changed, as well as blurred. Thus the observer has at his command the ability to quickly select a part of the picture to be analyzed, by direct view thereof on the ground glass screen. Thereafter by lifting the assembly to bring the projected reproduction dots on the 95% screen into focus and of the same pitch as the dots on the screen, the selection of any color can be made by rotation of the assembly to a position two or three degrees from the angle employed for the color under analysis.

For analyzing half tones of pictures such as 60, 120, 133, 150, or 300 to the inch, the screen 86 may be replaced with a screen of corresponding pitch by removing the cover 74, and substituting a screen of the pitch desired. In each case however the percent dot size of the screen will be above 90%, and preferably 95%. The screen thus appears as relatively dark, or 95% opaque.

By merely rotating the screen to different angles, any one of the colors of the reproduction 22 can be analyzed, and the actual angular range of movement of the screen to embrace the four colors referred to would be about 60 degrees.

While a low power viewing lens is employed which may be convex or concave as is understood in the art, it will appear from the foregoing that it is the selective effect of the 2 or 3° interference angle in combination with the viewing lens that renders it possible for even the unskilled to see and judge the dot size from the relative size of the effective dots produced by the interference. No high power magnifying glass by itself applied directly over the reproduction has any ability to separate one color from the other.

While a single modification of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a color analyzer for lithographic color half tones, which comprises a light casing having an open planar end for application to an area of a multi-color half tone reproduction to be analyzed lying in the plane of the open end, any one color of which is to be analyzed, said casing comprising a light source therewithin directed toward said opening, said casing having at its other end a viewing screen disposed in spaced parallel relation to said open planar end, a lens mounted within said casing intermediate said open end and said screen and of a focal length to reproduce an image upon said screen in correspondence with an object lying in the plane of the open end, a relatively dark half tone screen having a uniform dot periodicity corresponding to the dot periodicity of the colors of the half tone reproduction as projected on the viewing screen; disposed immediately beneath said viewing screen, means facilitating rotation of the half tone screen to disorient the axis of the half tone screen with respect to the axis of one color of the image of the multicolor half tone reproduction to produce an interference pattern of that color alone, a viewing lens disposed above said viewing screen for observation thereof, and means for vertically adjusting said screens into and out of focus.

2. In a color analyzer for lithographic color half tones, which comprises a light casing having an open planar end for application to an area of a multi-color half tone reproduction to be analyzed lying in the plane of the open end, any one color of which is to be analyzed, said casing comprising a light source therewithin directed toward said opening, said casing having at its other end a swivelly mounted viewing assembly having a viewing screen disposed in spaced parallel relation to said open planar end, a lens mounted within said casing intermediate said open end and said viewing assembly screen and of a focal length to reproduce an image upon said screen in correspondence with an object lying in the plane of the open end, and a 95% half tone screen having a uniform dot periodicity corresponding to the dot periodicity of the colors of the half tone reproduction as projected on the viewing screen disposed immediately beneath said viewing screen in said viewing assembly, whereby upon disorienting the axis of the half tone screen with respect to the axis of one color of the image of the multicolor half tone reproduction, an interference pattern of that color alone results.

3. In a color analyzer for lithographic color half tones, which comprises a light casing having an open planar end for application to an area of a multicolor half tone reproduction to be analyzed lying in the plane of the open end, any one color of which is to be analyzed, said casing comprising a light source therewithin directed toward said opening, said casing having at its other end a swivelly mounted viewing assembly having a viewing screen disposed in spaced parallel relation to said open planar end, a lens mounted within said casing intermediate said open end and said viewing assembly screen and of a focal length to reproduce an image upon said screen in correspondence with an object lying in the plane of the open end and a 95% half tone screen having a uniform dot periodicity corresponding to the dot periodicity of the colors of the half tone reproduction as projected on the viewing screen disposed immediately beneath said viewing screen in said viewing assembly, whereby upon disorienting the axis of the half tone screen with respect to the axis of one color of the image of the multicolor half tone reproduction, an interference pattern of that color alone results, and a viewing lens disposed above said viewing screen for observation thereof.

4. In a color ananlyzer for lithographic color half tones, which comprises a light casing having an open planar end for application to an area of a multicolor half tone reproduction to be analyzed lying in the plane of the open end, any one color of which is to be analyzed, said casing comprising a light source therewithin directed toward said opening, said casing having at its other end a swivelly mounted viewing assembly having a viewing screen disposed in spaced parallel relation to said open planar end, a lens mounted within said casing intermediate said open end and a said viewing assembly screen and of a focal length to reproduce an image upon said screen in correspondence with an object lying in the plane of the open end, a 95% half tone screen having a uniform dot periodicity corresponding to the dot periodicity of the colors of the half tone reproduction as projected on the viewing screen disposed immediately beneath said viewing screen in said viewing assembly, whereby upon disorienting the axis of the half tone screen with respect to the axis of one color of the image of the multicolor half tone reproduction, an interference pattern of that color alone results, a viewing lens disposed above said viewing screen for observation thereof, and means for vertically adjusting said assembly and screens into and out of focus.

5. In a color analyzer for lithographic color half tones, which comprises a light casing having an open planar end for applicaton to an area of multicolor half tone reproduction to be analyzed lying in the plane of the open end, any one color of which is to be analyzed, said casing comprising a light source therewithin directed toward said opening, said casing having at its other end a viewing screen disposed in spaced parallel relation to said open planar end, a lens mounted within said casing intermediate said open end and said screen and of a focal length to reproduce an image upon said screen in correspondence with an object lying in the plane of the open end, and an approximately 95% half tone screen having a uniform dot periodicity corresponding to the dot periodicity of the colors of the half tone reproduction as projected on the viewing screen rotatably disposed immediately beneath said viewing screen, for rotation in the plane of the half tone screen, whereby to disorient the axis of the half tone screen with respect to the axis of one color of the image of the multicolor half tone reproduction to produce an interference pattern of that color alone.

6. In a color analyzer for lithographic color half tones, which comprises a light casing having an open planar end for application to an area of a multicolor half tone reproduction to be analyzed lying in the plane of the open end, any one color of which is to be analyzed, said casing comprising a light source therewithin directed toward said opening, said casing having at its other end a viewing screen disposed in spaced parallel relation to said open planar end, a lens mounted within said casing intermediate said open end and said screen and of a focal length to reproduce an image upon said screen in correspondence with an object lying in the plane of the open end, an approximately 95% half tone screen having a uniform dot periodicity corresponding to the dot periodicity of the colors of the half tone reproduction as projected on the viewing screen rotatably disposed immediately beneath said viewing screen, for rotation in the plane of the half tone screen, whereby to disorient the axis of the half tone screen with respect to the axis of one color of the image of the multicolor half tone reproduction to produce an interference pattern of that color alone, and a viewing lens disposed above said viewing screen for observation thereof and means for vertically adjusting said screens relative to said lens.

7. In a color analyzer for lithographic color half tones, which comprises a light casing having an open planar end for application to an area of a multicolor half tone reproduction to be analyzed lying in the plane of the open end, any one color of which is to be analyzed, said casing comprising a light source therewithin directed toward said opening, means for cooling said casing, said casing having at its other end a viewing screen disposed in spaced parallel relation to said open planar end, a lens mounted within said casing intermediate said open end and said screen and of a focal length to reproduce an image upon said viewing screen in correspondence with an object lying in the plane of the open end, an approximately 95% half tone screen having a uniform dot periodicity corresponding to the dot periodicity of the colors of the half tone reproduction as projected on the viewing screen rotatably disposed immediately beneath said viewing screen, whereby to disorient the axis of the half tone screen with respect to the axis of one color of the image of the multicolor half tone reproduction to produce an interference pattern of that color alone, and a viewing lens disposed above said viewing screen for observation thereof, and means for moving said screens toward said first named lens from a position in focus therewith.

8. In a color analyzer for lithographic color half tones, which comprises a light casing having an open planar end for application to an area of a multicolor half tone reproduction to be analyzed lying in the plane of the open end, any one color of which is to be analyzed, means to illuminate the area of a half tone reproduction disposed at the open end, said casing having, at its other end, viewscreen means disposed in spaced relation to said open planar end and including a 95% half tone screen, a lens mounted within said casing intermediate said open end and said screen means and of a focal length to reproduce an image in the plane of said screen means in correspondence with an object lying in the plane of the open end, the dot periodicity of the half tone screen being uniform and corresponding to the dot periodicity of the color of the half tone reproduction as projected on the viewing screen means, and means to rotate the axis of the half tone screen whereby to disorient by a few degrees the half tone screen axis with respect to the axis of one of the colors of the image of the multicolor half tone reproduction to produce an interference pattern with respect to said color alone.

References Cited by the Examiner

UNITED STATES PATENTS

| | | | |
|---|---|---|---|
| 2,559,915 | 7/1951 | Gaebel | 88—14 |
| 2,972,283 | 2/1961 | Karnow | 88—24 |

FOREIGN PATENTS

| | | |
|---|---|---|
| 782,831 | 9/1957 | Great Britain. |

JEWELL H. PEDERSEN, *Primary Examiner.*

J. K. CORBIN, *Assistant Examiner.*